(12) United States Patent
Wang et al.

(10) Patent No.: US 11,703,983 B2
(45) Date of Patent: Jul. 18, 2023

(54) CAPACITANCE SENSING CIRCUIT

(71) Applicant: SENSORTEK TECHNOLOGY CORP., Zhubei (TW)

(72) Inventors: Tun-Ju Wang, Zhubei (TW); Ching-Jen Tung, Zhubei (TW); Chi-Huan Lu, Zhubei (TW); Chun-Yu Lin, Zhubei (TW); Yen-Shao Lin, Zhubei (TW)

(73) Assignee: Sensortek Technology Corp, Jhubei City (TW)

( * ) Notice: Subject to any disclaimer, the term of this patent is extended or adjusted under 35 U.S.C. 154(b) by 0 days.

(21) Appl. No.: 17/212,319

(22) Filed: Mar. 25, 2021

(65) Prior Publication Data

US 2022/0019302 A1 Jan. 20, 2022

Related U.S. Application Data

(60) Provisional application No. 62/994,290, filed on Mar. 25, 2020.

(51) Int. Cl.
*G06F 3/044* (2006.01)
*G06F 3/041* (2006.01)

(52) U.S. Cl.
CPC .......... *G06F 3/044* (2013.01); *G06F 3/04164* (2019.05); *G06F 3/04182* (2019.05)

(58) Field of Classification Search
CPC ...... G06F 3/044; G06F 3/04164; G06F 3/041; G06F 3/0416; G06F 3/04182
See application file for complete search history.

(56) References Cited

U.S. PATENT DOCUMENTS

| | | | | | |
|---|---|---|---|---|---|
| 3,772,684 A | * | 11/1973 | Scantlin | ................ | H04L 25/40 336/131 |
| 4,742,392 A | * | 5/1988 | Hashimoto | ............ | H04N 5/185 348/695 |
| 4,748,295 A | * | 5/1988 | Rogers | .................... | G06F 3/041 327/306 |
| 4,987,321 A | * | 1/1991 | Toohey | .................. | G11C 27/04 327/94 |
| 5,216,509 A | * | 6/1993 | Hirasawa | ............... | H04N 5/363 348/241 |
| 5,543,590 A | * | 8/1996 | Gillespie | ............... | G06F 3/0488 345/174 |
| 5,936,617 A | * | 8/1999 | Uchino | ................ | G09G 3/3611 345/204 |

(Continued)

FOREIGN PATENT DOCUMENTS

| CN | 102934061 A | 2/2013 |
|---|---|---|
| CN | 107112990 A | 8/2017 |

(Continued)

OTHER PUBLICATIONS

Office Action and Search Report for counterpart Taiwanese Application No. 110110947, dated Dec. 23, 2021.

*Primary Examiner* — Amy Onyekaba
(74) *Attorney, Agent, or Firm* — Rosenberg. Klein & Lee

(57) ABSTRACT

The application relates to a capacitance sensing circuit, which samples and holds a reference signal to generate an input reference signal, hereby, an input signal is generated to a sensing circuit. Thereby, the sensing circuit generates an output signal according to the input signal and a sensing signal, for the capacitance sensing.

8 Claims, 3 Drawing Sheets

(56) References Cited

U.S. PATENT DOCUMENTS

| | | | | |
|---|---|---|---|---|
| 6,262,464 B1* | 7/2001 | Chan | H03H 9/465 | 257/416 |
| 6,452,514 B1* | 9/2002 | Philipp | G01D 5/2405 | 178/18.06 |
| 9,086,439 B2* | 7/2015 | Erdogan | G01D 5/24 | |
| 9,569,052 B2* | 2/2017 | Hu | G06F 3/04182 | |
| 9,600,707 B1* | 3/2017 | Ramberg | G06F 3/045 | |
| 9,660,644 B2* | 5/2017 | Buttolo | H03K 17/955 | |
| 10,006,803 B2* | 6/2018 | Ishikawa | G06F 3/03545 | |
| 10,444,892 B2* | 10/2019 | Portmann | G06F 3/044 | |
| 10,996,183 B2* | 5/2021 | Iwata | G01N 27/223 | |
| 11,073,940 B2* | 7/2021 | Cui | G06F 3/0445 | |
| 2002/0089491 A1* | 7/2002 | Willig | G06F 3/04184 | 345/173 |
| 2007/0001784 A1* | 1/2007 | Morita | H03H 9/2463 | 333/186 |
| 2007/0159184 A1* | 7/2007 | Reynolds | H03K 17/955 | 324/662 |
| 2007/0262966 A1* | 11/2007 | Nishimura | G06F 3/0443 | 345/173 |
| 2007/0276550 A1* | 11/2007 | Desai | B60S 1/0825 | 701/1 |
| 2008/0013934 A1* | 1/2008 | Uenaka | H04N 23/6815 | 348/208.11 |
| 2009/0273691 A1* | 11/2009 | Mo | H04N 5/361 | 348/246 |
| 2010/0060610 A1* | 3/2010 | Wu | G06F 3/044 | 345/174 |
| 2010/0110040 A1* | 5/2010 | Kim | G06F 3/0446 | 345/174 |
| 2010/0134440 A1* | 6/2010 | Hayakawa | G06F 3/0447 | 345/174 |
| 2010/0176861 A1* | 7/2010 | Dai | H03K 5/133 | 327/283 |
| 2010/0327841 A1* | 12/2010 | Ito | G11C 5/147 | 323/313 |
| 2011/0069036 A1* | 3/2011 | Anno | G06F 3/03545 | 345/174 |
| 2011/0115729 A1* | 5/2011 | Kremin | G06F 3/0445 | 345/173 |
| 2011/0133751 A1* | 6/2011 | Kuramochi | H03M 1/1038 | 324/555 |
| 2011/0234240 A1* | 9/2011 | Yager | A61B 5/4875 | 324/634 |
| 2011/0234528 A1* | 9/2011 | Guedon | H03M 11/20 | 341/122 |
| 2012/0161846 A1* | 6/2012 | Ningrat | G06F 3/04182 | 327/365 |
| 2012/0188022 A1* | 7/2012 | Nylen | H03B 5/1847 | 331/34 |
| 2012/0217981 A1* | 8/2012 | Erdogan | G06F 3/044 | 324/679 |
| 2012/0262411 A1* | 10/2012 | Ahn | G06F 3/0442 | 345/204 |
| 2012/0268144 A1* | 10/2012 | Ahn | G06F 3/0446 | 324/679 |
| 2013/0057501 A1* | 3/2013 | Nagata | G06F 3/0443 | 345/173 |
| 2013/0141139 A1* | 6/2013 | Ballan | H03K 17/962 | 327/51 |
| 2013/0215053 A1* | 8/2013 | Lin | G06F 3/04184 | 345/173 |
| 2013/0307818 A1* | 11/2013 | Pope | G06V 40/1318 | 345/174 |
| 2013/0314109 A1* | 11/2013 | Kremin | G06F 3/0446 | 324/686 |
| 2014/0009171 A1* | 1/2014 | Ujvari | G01R 27/02 | 324/647 |
| 2014/0043283 A1* | 2/2014 | Kim | G06F 3/046 | 345/174 |
| 2014/0098039 A1* | 4/2014 | Oda | H03K 17/9622 | 345/173 |
| 2014/0267157 A1* | 9/2014 | Dorfner | G01D 5/24 | 345/174 |
| 2014/0285448 A1* | 9/2014 | Kim | G06F 3/044 | 345/173 |
| 2014/0354604 A1* | 12/2014 | Huang | G06F 3/03545 | 345/179 |
| 2015/0029141 A1* | 1/2015 | Jo | G06F 3/04182 | 345/174 |
| 2015/0091829 A1* | 4/2015 | Endo | G11C 5/147 | 345/94 |
| 2015/0123940 A1* | 5/2015 | Park | G06F 3/0441 | 345/174 |
| 2015/0130649 A1* | 5/2015 | Itakura | H03M 1/1295 | 341/157 |
| 2015/0193047 A1* | 7/2015 | Hoshtanar | G06F 3/0443 | 345/174 |
| 2015/0309616 A1* | 10/2015 | Stern | G06F 3/04182 | 345/174 |
| 2015/0323695 A1* | 11/2015 | Stauber | G01V 3/12 | 324/239 |
| 2015/0369655 A1* | 12/2015 | Ishikawa | H03K 5/088 | 73/579 |
| 2016/0092028 A1* | 3/2016 | Vallis | G01R 35/005 | 345/174 |
| 2016/0196230 A1* | 7/2016 | Pihet | G06F 13/4027 | 710/314 |
| 2016/0285464 A1* | 9/2016 | Obata | H03B 5/36 | |
| 2017/0016255 A1* | 1/2017 | Guibbert | E05B 81/04 | |
| 2017/0038898 A1* | 2/2017 | Kim | G09G 3/3233 | |
| 2017/0060297 A1* | 3/2017 | Gradinariu | H03K 17/9622 | |
| 2017/0068378 A1* | 3/2017 | Caldwell | G06F 3/04166 | |
| 2017/0090599 A1* | 3/2017 | Kuboyama | H03K 17/962 | |
| 2017/0269754 A1* | 9/2017 | Liu | G06F 3/0444 | |
| 2017/0285775 A1* | 10/2017 | Park | G06F 3/03545 | |
| 2017/0285862 A1* | 10/2017 | Hu | G05F 3/08 | |
| 2017/0373686 A1* | 12/2017 | Wendt | H03K 17/955 | |
| 2018/0004338 A1* | 1/2018 | Khazeni | G06F 3/041 | |
| 2018/0018054 A1* | 1/2018 | Kimura | G02F 1/13338 | |
| 2018/0074004 A1* | 3/2018 | Lin | G01N 27/228 | |
| 2018/0074647 A1* | 3/2018 | Endo | G11C 5/147 | |
| 2018/0089492 A1* | 3/2018 | Cai | H04M 1/0266 | |
| 2018/0093695 A1* | 4/2018 | Hattori | B62D 1/046 | |
| 2018/0139323 A1* | 5/2018 | Kim | H04M 1/72466 | |
| 2018/0150168 A1* | 5/2018 | Jung | H03M 1/12 | |
| 2018/0167575 A1* | 6/2018 | Watanabe | H04N 5/378 | |
| 2018/0209937 A1* | 7/2018 | Iizuka | H01L 23/3185 | |
| 2018/0275795 A1* | 9/2018 | Takahashi | G06F 3/0447 | |
| 2018/0349662 A1* | 12/2018 | Lin | A61B 5/1172 | |
| 2019/0014274 A1* | 1/2019 | Lin | H04N 5/374 | |
| 2019/0027807 A1* | 1/2019 | Choi | H01Q 5/378 | |
| 2019/0041348 A1* | 2/2019 | Ashida | G01R 27/2623 | |
| 2019/0064962 A1* | 2/2019 | Bye | G06F 3/041662 | |
| 2019/0095031 A1* | 3/2019 | Lee | G06F 3/0445 | |
| 2019/0173988 A1* | 6/2019 | Lee | H04B 1/3888 | |
| 2019/0187832 A1* | 6/2019 | Lee | G06F 3/0412 | |
| 2019/0250756 A1* | 8/2019 | Kumar | G11C 27/02 | |
| 2020/0110498 A1* | 4/2020 | Lee | G06F 3/0412 | |
| 2020/0159385 A1* | 5/2020 | Chung | G06F 3/0412 | |
| 2020/0373923 A1* | 11/2020 | Walsh | G01D 5/2006 | |
| 2021/0019009 A1* | 1/2021 | Jung | G06F 3/044 | |
| 2021/0048936 A1* | 2/2021 | Cui | G06F 3/0446 | |
| 2022/0035501 A1* | 2/2022 | Kobori | G06F 3/0441 | |

FOREIGN PATENT DOCUMENTS

| | | |
|---|---|---|
| CN | 107562253 A | 1/2018 |
| CN | 107683455 A | 2/2018 |
| TW | 201331808 A | 8/2013 |
| TW | 201447714 A | 12/2014 |

* cited by examiner

CAPACITANCE SENSING CIRCUIT

FIELD OF THE INVENTION

The present application relates to a sensing circuit, and more particularly relates to a capacitance sensing circuit.

BACKGROUND OF THE INVENTION

Nowadays, most electronic devices are equipped with a touch-control circuit and a proximity sensor used to control the transmitting power of the radio frequency circuit. The touch-control circuit is used to detect the position where user touches the touch panel of the electronic device to perform the corresponding event. The proximity sensor is used to detect whether user is approaching the electronic device or not. If user is approaching the electronic device, the transmitting power of the radio frequency circuit may be reduced to control the Specific Absorption Rate (SAR) within the specification and avoid from threating human health. The capacitive touch-control circuit and the proximity sensor may detect the change of the capacitance of a sensing electrode in the electronic device, and decide whether the user has touched the touch panel or approaching the electronic device or not. The capacitance sensing circuit is used to detect the capacitance of the sensing electrode. Normally, the capacitance sensing circuit applies an input signal to drive the charge on the sensing electrode to be transferred to the capacitance sensing circuit for sensing the capacitance of the sensing electrode, and then measuring the amount of capacitance change of the sensing electrode. Due to the fact that the input signal comes from the internal circuit of the electronic device such as the power supply circuit, it will contain additional noise. The noise of the input signal will decrease the Signal-to-Noise Ratio (SNR), which will deteriorate the accuracy of the capacitance sensing of the capacitance sensing circuit for the sensing electrode, on particular when the capacitance of the sensing electrode is large.

Based on the aforesaid issue, the present application provides a capacitance sensing circuit that may reduce the influence of noise on the capacitance sensing circuit, enhance the SNR and improve the accuracy of the capacitance sensing.

SUMMARY

An objective of the present application is to provide a capacitance sensing circuit, which samples and holds a reference signal inputted to the capacitance sensing circuit for generating an input reference signal. According to the input reference signal, the capacitance sensing circuit will generate an input signal; the noise of the input signal is fixed within a period and wouldn't change along with time. It makes most part of the noise may be processed and removed and thus improves the SNR.

The present application discloses a capacitance sensing circuit, including a sample-hold circuit, a signal generating circuit and a sensing circuit. The sample-hold circuit samples and holds a reference signal for generating an input reference signal to the signal generating circuit. The signal generating circuit generates an input signal according to the input reference signal. The sensing circuit generates an output signal according to the input signal and a sensing signal.

DETAILED DESCRIPTION

To enable the Review Committee members having deeper realization and understanding on the features and functions of the present application, we hereby put the embodiment and detailed explanation in below:

Some words in the specifications and the claims are used to indicate the specific elements. However, a person having ordinary skill in the art should understand that the manufacturer may use different names to refer to the same element. Moreover, the specifications and claims do not use the name difference as a way to distinguish elements, but will take the differences in overall technology of elements as the distinction criteria. The "comprising" and "including" mentioned in the entire specifications and the claims are "open" terms, it should be interpreted as "comprising/including but not limited to". Furthermore, the term "coupling" includes any direct and indirect means of connection. Therefore, if a first device is described to be coupled to a second device, it means that the first device may be directly connected to the second device or indirectly connected to the second device through other devices or other means of connection.

Since the conventional capacitance sensing circuit has relatively poor SNR due to the fact that the input signal has time-variable noise, the present application thus discloses a capacitance sensing circuit which may solve the issue of poor SNR made from the conventional technology.

Figure 1:
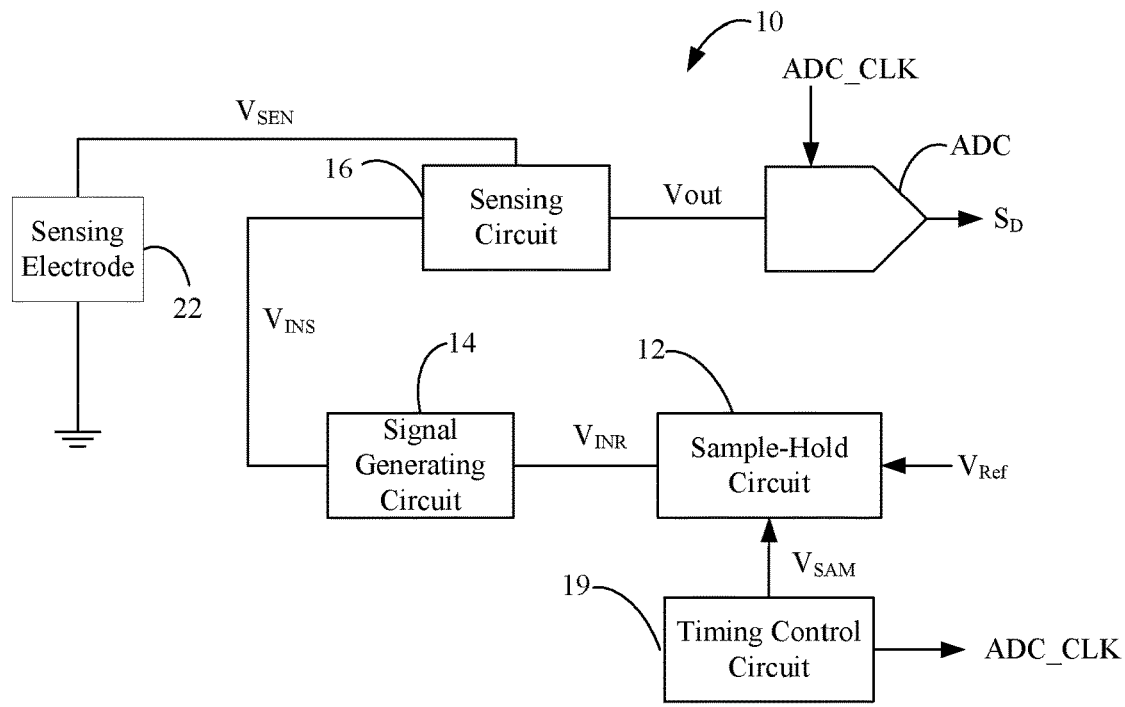
FIG. 1 illustrates a block diagram of the capacitance sensing circuit according to an embodiment of the present application.
Figure 3:
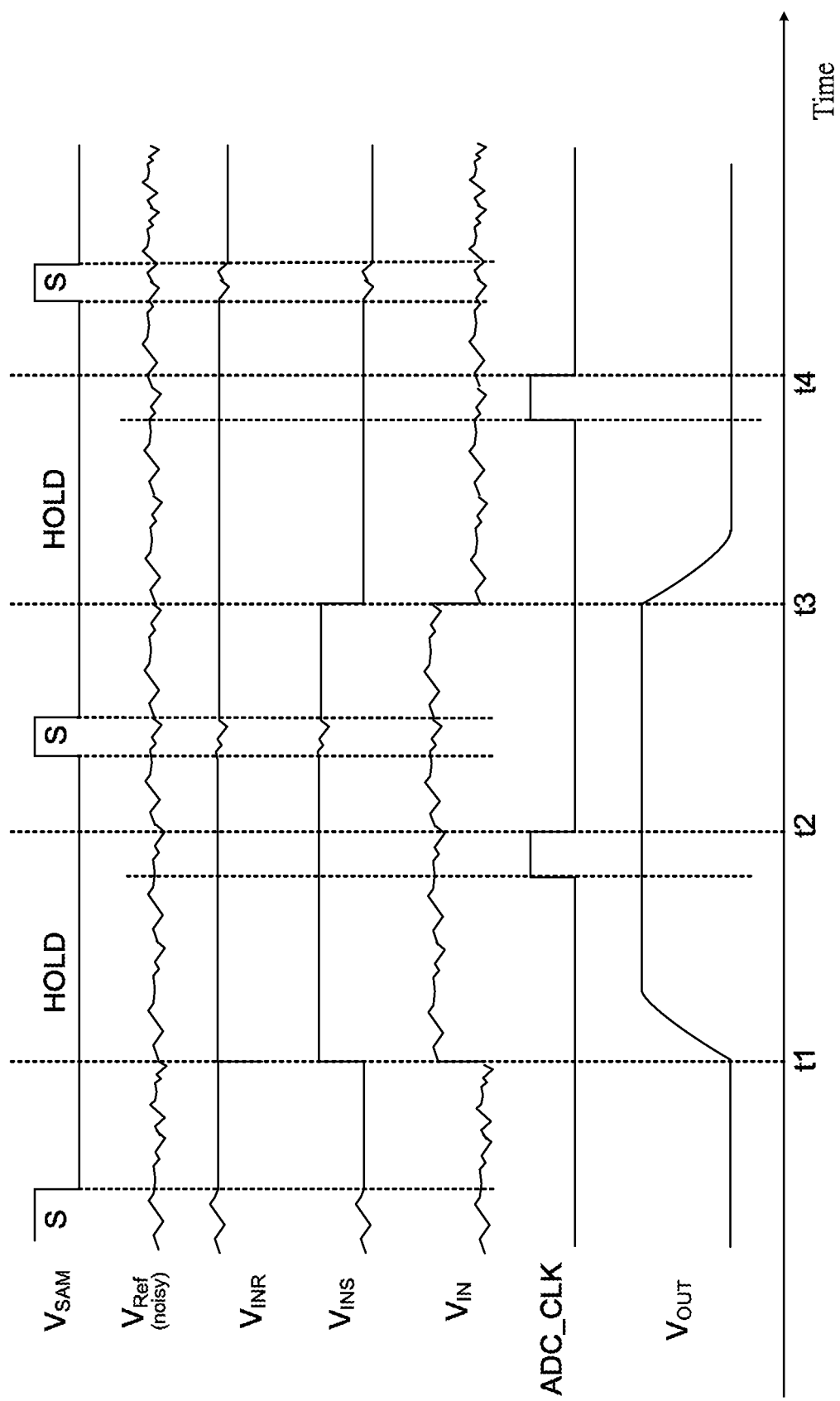
FIG. 3 illustrates a timing diagram according to an embodiment of the present application.

Hereinafter we will further describe the characteristics and circuit structure included in the capacitance sensing circuit disclosed in the present application:

First of all, refer to FIG. 1, which is the block diagram of capacitance sensing circuit according to an embodiment of the present application. As shown in the figure, the capacitance sensing circuit 10 of the present application comprises a sample-hold circuit 12, a signal generating circuit 14 and a sensing circuit 16. The sample-hold circuit 12 is coupled with the signal generating circuit 14, and the signal generating circuit 14 is coupled with the sensing circuit 16. The sample-hold circuit 12 samples and holds a reference signal $V_{Ref}$ for generating an input reference signal $V_{INR}$. The signal generating circuit 14 generates an input signal $V_{INS}$ according to the input reference signal $V_{INR}$; the sensing circuit 16 generates an output signal $V_{OUT}$ according to the input signal $V_{INS}$ and a sensing signal $V_{SEN}$ coming from a sensing electrode 22. In an embodiment of the present application, the sensing electrode 22 is equipped in the electronic devices such as the panel of the electronic devices. As shown in FIG. 3, since the reference signal $V_{Ref}$ contains the time-variable noise, the level of the reference signal $V_{Ref}$ also is time-variable. The sample-hold circuit 12 samples the reference signal $V_{Ref}$ and holds the signal level of the sampled reference signal $V_{Ref}$ for generating the input reference signal $V_{INR}$; thus, the level of the input reference signal $V_{INR}$ holds still and won't change along with time during the holding period (HOLD) of the sample-hold circuit 12. Therefore, the level (high level or low level) of the input signal $V_{INS}$ generated by the signal generating circuit 14 according to the input reference signal $V_{INR}$ also won't change along with time during the holding period (HOLD) of the sample-hold circuit 12. Besides, the sensing circuit 16 is further coupled to an analog-digital converting circuit ADC; the analog-digital converting circuit ADC receives the output signal $V_{OUT}$ and converts the analog output signal $V_{OUT}$ to a digital signal $S_D$.

Figure 2:
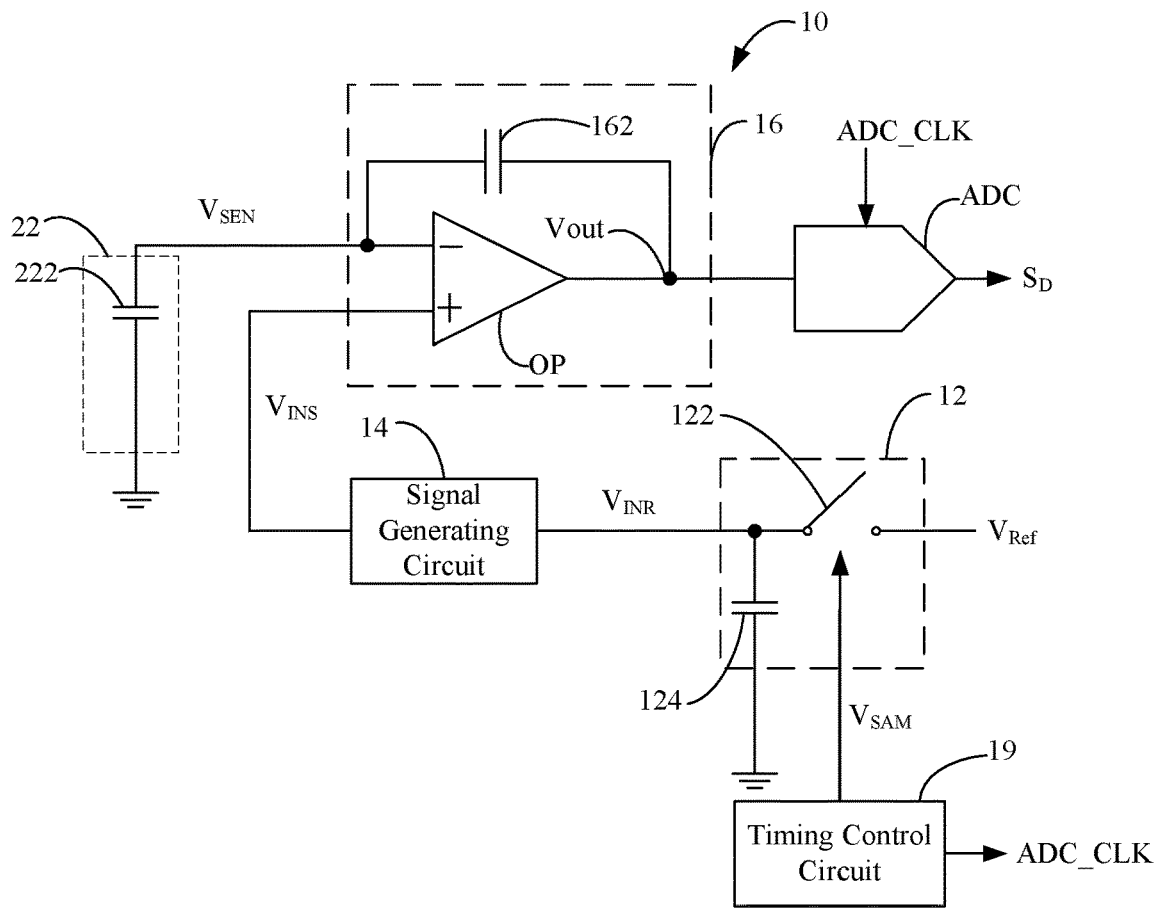
FIG. 2 illustrates a circuit diagram of the capacitance sensing circuit according to an embodiment of the present application.

In order to clearly understand the capacitance sensing circuit 10 of the aforesaid embodiment of the present application, we further use FIG. 2 to make interpretation. The sample-hold circuit 12 includes a switch 122 and an energy storing element 124 (such as the capacitor); the switch 122 is coupled between the energy storing element 124 and the reference signal $V_{Ref}$. The switch 122 is coupled with a timing control circuit 19 and is controlled by the sampling signal $V_{SAM}$ generated by the timing control circuit 19, and is turned on or off according to the sampling signal $V_{SAM}$. When the switch 122 is turned on, the reference signal $V_{Ref}$ is sampled to the energy storing element 124, and the energy storing element 124 holds the signal level of the reference signal $V_{Ref}$ while the switch 122 is turned on, and therefore generates the input reference signal $V_{INR}$. The energy storing element 124 is coupled to the signal generating circuit 14 for providing the input reference signal $V_{INR}$ to the signal generating circuit 14.

The signal generating circuit 14 receives the input reference signal $V_{INR}$ generated by the sample-hold circuit 12, and generates the input signal $V_{INS}$ required by the sensing circuit 16 according to the input reference signal $V_{INR}$. As shown in FIG. 3, the level of the input signal $V_{INS}$ may be changed to the high or low level during a fixed period; in an embodiment of the present application, the input signal $V_{INS}$ may be a square signal. The sensing circuit 16 includes an operational amplifier OP and a capacitor 162; the operational amplifier OP has a first input terminal, a second input terminal and an output terminal; the first input terminal of the operational amplifier OP receives the input signal $V_{INS}$ from the signal generating circuit 14; the second input terminal of the operational amplifier OP is coupled to the sensing electrode 22 and receives the sensing signal $V_{SEN}$; the sensing electrode 22 is equivalent to a capacitor 222, the capacitance of the capacitor 222 is changed when an object is approaching the sensing electrode 22, that is, the capacitance will be changed when the object is approaching the electronic device; the object is a touch object, such as user's finger or a touch pen; therefore, the sensing electrode 22 may be equivalent to an sensing capacitance for sensing if an object is approaching the electronic device. The capacitor 162 is coupled between the second input terminal and the output terminal of the operational amplifier OP. By transferring the input signal $V_{INS}$ to the first input terminal of the operational amplifier OP may drive the charge in the capacitor 222 be transferred to the capacitor 162, that is, the charge of the sensing signal $V_{SEN}$ of the capacitor 222 is transferred to the capacitor 162. Hereby, the sensing circuit 16 generates the output signal $V_{OUT}$ in the output terminal of the operational amplifier OP according to the input signal $V_{INS}$ and the sensing signal $V_{SEN}$. The analog-digital converting circuit ADC receives the output signal $V_{OUT}$ for converting it and generating the digital signal $S_D$. Since the aforesaid charge transferring is driven by the input signal $V_{INS}$, the charge-transfer amount is proportional to the level of the input signal $V_{INS}$; therefore, the level of the output signal $V_{OUT}$ may be expressed as follows:

$$V_{OUT} = V_{INS} * \frac{C_P}{C_{REF}}$$

Wherein $C_P$ is the capacitance of the capacitor 222 of the sensing electrode 22, $C_{REF}$ is the capacitance of the capacitor 162 of the sensing circuit 16.

Refer to FIG. 3, which is the timing diagram of the signal of the capacitance sensing circuit according to the present application. As shown in the figure, in this embodiment, the sampling signal $V_{SAM}$ is enabled (high level) once in each fixed period; that is, the sample-hold circuit 12 samples the reference signal $V_{Ref}$ once in each fixed period to generate the input reference signal $V_{INR}$. The signal generating circuit 14 generates the input signal $V_{INS}$ according to the input reference signal $V_{INR}$. In this embodiment, the analog-digital converting circuit ADC samples the output signal $V_{OUT}$ once during the positive period and once during the negative period of the input signal $V_{INS}$. Therefore, the timing control circuit 19 generates a clock signal ADC_CLK to the analog-digital converting circuit ADC once during the positive period of the input signal $V_{INS}$ and once during the negative period of the input signal $V_{INS}$ to control the analog-digital converting circuit ADC sampling the output signal $V_{OUT}$, and converting the output signal $V_{OUT}$ to generate the digital signal $S_D$; for example, at the second time point t2 and the fourth time point t4. As shown in the figure, the level of the input signal $V_{INS}$ changes from a low level to a high level at the first time point t1, and changes from the high level to the low level at the third time point t3.

As shown in FIG. 2 and FIG. 3, since the analog-digital converting circuit ADC samples the output signal $V_{OUT}$ at the positive period and the negative period, it samples the output signal $V_{OUT}$ (t2) at the second time point t2 and the output signal $V_{OUT}$ (t4) at the fourth time point t4; the output signals $V_{OUT}$ (t2) and $V_{OUT}$ (t4) may be expressed as follows:

$$V_{OUT}(t2) = V_{INS}(t2) + \{V_{INS}(t2) - V_{INS}(t1)\}\frac{C_P}{C_{REF}} \quad \text{Equation (1)}$$

$$V_{OUT}(t4) = V_{INS}(t4) + \{V_{INS}(t4) - V_{INS}(t3)\}\frac{C_P}{C_{REF}} \quad \text{Equation (2)}$$

Since the reference signal $V_{Ref}$ contains noise, the input reference signal $V_{INR}$ generated by the sample-hold circuit 12 sampling the reference signal $V_{Ref}$ also contains noise, and the input signal $V_{INS}$ also contains noise as well, which may be expressed as $V_{INS}(t)=V_{INS0}(t)+V_{INSN}(t)$; by substituting them into the Equations (1) and (2), the output signal containing the noise as:

$$V_{OUT}(t2) = \quad \text{Equation (3)}$$
$$V_{OUT0}(t2) + V_{INSN}(t2) + \{V_{INSN}(t2) - V_{INSN}(t1)\}\frac{C_P}{C_{REF}}$$

$$V_{OUT}(t4) = \quad \text{Equation (4)}$$
$$V_{OUT0}(t4) + V_{INSN}(t4) + \{V_{INSN}(t4) - V_{INSN}(t3)\}\frac{C_P}{C_{REF}}$$

Wherein $V_{INS0}(t)$ expresses the input signal without the noise; $V_{INSN}(t)$ expresses the noise of the input signal. $V_{OUT0}(t2)$ and $V_{OUT0}(t4)$ express the output signal without the noise, which may be expressed as follows:

$$V_{OUT0}(t2) = V_{INS0}(t2) + \{V_{INS0}(t2) - V_{INS0}(t1)\}\frac{C_P}{C_{REF}} \quad \text{Equation (5)}$$

-continued $$V_{OUT0}(t4) = V_{INS0}(t4) + \{V_{INS0}(t4) - V_{INS0}(t3)\}\frac{C_P}{C_{REF}} \quad \text{Equation (6)}$$

In the present application, the sample-hold circuit 12 samples the reference signal $V_{Ref}$ before time point t1 and between time points t2 and t3 to generate the input reference signal $V_{INR}$ and holds the input reference signal $V_{INR}$, it means that the level of the input reference signal $V_{INR}$ won't be changed by the level of subsequent reference signal $V_{Ref}$ until the sample-hold circuit 12 re-samples the reference signal $V_{Ref}$. Therefore, the signal generating circuit 14 generates a high or low level of the input signal $V_{IN}$ according to the input reference signal $V_{INR}$, in which the level of the input signal $V_{INS}$ also won't be changed by the level of subsequent reference signal $V_{Ref}$. Thus, it means that the noise $V_{INSN}(t1)$ included in the input signal $V_{INS}(t1)$ at the first time point t1 is equal to the noise $V_{INSN}(t2)$ included in the input signal $V_{INS}(t2)$ at the second time point t2, that is, $V_{INSN}(t1)=V_{INSN}(t2)$. At the same circumstance, the noises included in the input signal $V_{INS}$ at the third time point t3 and the fourth time point t4 are equal too, that is, $V_{INSN}(t3)=V_{INSN}(t4)$. The $V_{INSN}(t1)=V_{INSN}(t2)$ and $V_{INSN}(t3)=V_{INSN}(t4)$ are substituted into the Equation (3) and Equation (4) for obtaining the following Equation (7) and Equation (8):

$$V_{OUT}(t2)=V_{OUT0}(t2)+V_{INSN}(t2) \quad \text{Equation (7)}$$

$$V_{OUT}(t4)=V_{OUT0}(t4)+V_{INSN}(t4) \quad \text{Equation (8)}$$

From Equation (7) and Equation (8), the output signal $V_{OUT}(t)$ generated by the sensing circuit 16 according to the present application contains smaller noise content and thus the SNR is increased. According to above description, when the sample-hold circuit 12 samples the reference signal $V_{Ref}$, most noise in the subsequent input signal $V_{INS}$ will offset to make the noise of the output signal $V_{OUT}$ be greatly reduced. The label $V_{IN}$ in FIG. 3 is the input signal of conventional technologies; obviously, the level of the input signal $V_{IN}$ is constantly changed due to the influence of the reference signal $V_{Ref}$.

In this embodiment, the analog-digital converting circuit ADC samples the output signal $V_{OUT}$ at both the positive period and the negative period of the input signal $V_{INS}$, and converts the two output signals $V_{OUT}$ into two digital signals $S_D$; the subsequent signal processing circuit (shown in FIG. 4) will subtract these two digital signals $S_D$, the result obtained is a detecting data that may express the capacitance of the sensing electrode 22. In addition, the analog-digital converting circuit ADC of the present application may sample the output signal $V_{OUT}$ once at the positive period or the negative period of the input signal $V_{INS}$ to generate a digital signal $S_D$; the subsequent signal processing circuit may directly use this digital signal $S_D$ as the detecting data. In the other embodiment of the present application, the signal processing circuit may average many digital signals $S_D$, the result obtained is the detecting data to improve the accuracy of the capacitance sensing.

Figure 4:
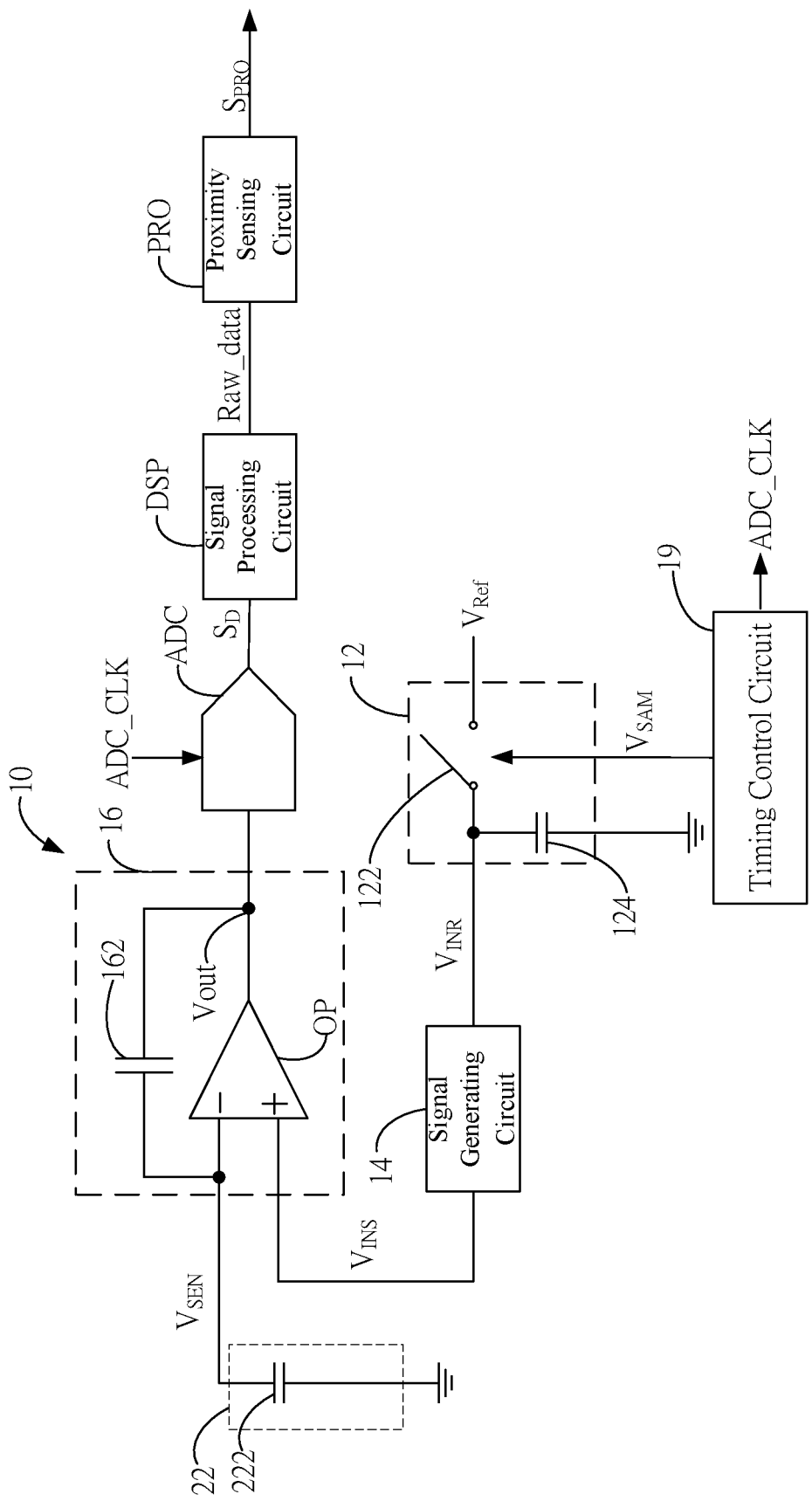
FIG. 4 illustrates a circuit diagram according to the other embodiment of the present application.

In the other embodiment of the present application, the capacitance sensing circuit 10 of the present application may be applied to the chips that are used to control the specific absorption rate (SAR). As shown in FIG. 4, the capacitance sensing circuit 10 may work with the analog-digital converting circuit ADC and further with a signal processing circuit DSP and a proximity sensing circuit PRO. The output terminal of the analog-digital converting circuit ADC is coupled with the input terminal of the signal processing circuit DSP, and the output terminal of the signal processing circuit DSP is coupled with the input terminal of the proximity sensing circuit PRO. The signal processing circuit DSP generates a detecting data Raw_data according to the digital signal $S_D$; the proximity sensing circuit PRO obtains the change of capacitance of the sensing electrode 22 according to the detecting data Raw_data; judging if there is an object approaching the electronic devices; and it may generate a proximity signal $S_{PRO}$ to express if there is an object that is approaching the capacitance sensing circuit 10 or not.

Moreover, the capacitance sensing circuit 10 of the present application may be applied to the touch detection application and not merely on the proximity detection.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A capacitance sensing circuit, comprising:
   a sample-hold circuit, sampling a reference signal and holding a signal level of the sampled reference signal to generate an input reference signal;
   a signal generating circuit, generating an input signal according to the input reference signal; and
   a sensing circuit, generating an output signal according to the input signal and a sensing signal from a sensing electrode.

2. The capacitance sensing circuit of claim 1, wherein the sample-hold circuit includes:
   an energy storing element, coupled to the signal generating circuit; and
   a switch, coupled between the energy storing element and the reference signal, turned on according to a sampling signal to sample the reference signal for generating and holding the input reference signal in the energy storing element.

3. The capacitance sensing circuit of claim 2, wherein the switch is coupled with a timing control circuit; the timing control circuit generates the sampling signal to the switch to control the switch sampling the reference signal.

4. The capacitance sensing circuit of claim 1, wherein the signal generating circuit generates the input signals with the high or low level to the sensing circuit according to the input reference signal.

5. The capacitance sensing circuit of claim 1, wherein the sensing circuit includes:
   an operational amplifier, having a first input terminal, a second input terminal and an output terminal, the first input terminal receiving the input signal, the second input terminal receiving the sensing signal, and generating the output signal at the output terminal according to the input signal and the sensing signal; and
   a capacitor, coupled between the second input terminal and the output terminal of the operational amplifier.

6. The capacitance sensing circuit of claim 1, wherein the sensing circuit is further coupled to an analog-digital converting circuit; the analog-digital converting circuit converts the output signal and generates a digital signal.

7. The capacitance sensing circuit of claim 6, wherein the analog-digital converting circuit is coupled to a signal processing circuit; the signal processing circuit generates a detecting data according to the digital signal.

8. The capacitance sensing circuit of claim 7, wherein the signal processing circuit is coupled to a proximity sensing circuit; the proximity sensing circuit generates a proximity signal according to the detecting data.

* * * * *